(12) United States Patent
Song et al.

(10) Patent No.: US 9,518,653 B2
(45) Date of Patent: Dec. 13, 2016

(54) APPARATUS AND METHOD FOR SHIFT PERCEPTION

(71) Applicant: HYUNDAI MOTOR COMPANY, Seoul (KR)

(72) Inventors: Ki-Young Song, Seoul (KR); Chang-Hyun Lee, Seoul (KR); Han-Gil Park, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/656,499

(22) Filed: Mar. 12, 2015

(65) Prior Publication Data

US 2016/0116058 A1    Apr. 28, 2016

(30) Foreign Application Priority Data

Oct. 22, 2014  (KR) .................... 10-2014-0143189

(51) Int. Cl.
  *G06F 7/00*  (2006.01)
  *F16H 61/02*  (2006.01)

(52) U.S. Cl.
  CPC ....... *F16H 61/0204* (2013.01); *F16H 2306/00* (2013.01)

(58) Field of Classification Search
  CPC .................... F16H 61/0204; F16H 2306/00
  See application file for complete search history.

(56) References Cited

U.S. PATENT DOCUMENTS

| | | | | |
|---|---|---|---|---|
| 2011/0234502 A1* | 9/2011 | Yun | .................... | G06F 3/016 345/173 |
| 2011/0248947 A1* | 10/2011 | Krahenbuhl | .......... | G06F 1/1626 345/174 |
| 2014/0128144 A1* | 5/2014 | Bavitz | ...................... | A63F 9/24 463/23 |

FOREIGN PATENT DOCUMENTS

| | | |
|---|---|---|
| JP | H11-230337 A | 8/1999 |
| JP | 2004-275419 A | 10/2004 |
| JP | 2005-118248 A | 5/2005 |
| JP | 2006-177401 A | 7/2006 |
| JP | 2010-230072 A | 10/2010 |
| KR | 10-1024147 B1 | 3/2011 |
| KR | 10-2011-0057861 A | 6/2011 |
| KR | 10-2013-0013920 A | 2/2013 |

* cited by examiner

*Primary Examiner* — David J Hlavka
(74) *Attorney, Agent, or Firm* — McDermott Will & Emery LLP

(57) ABSTRACT

An apparatus for shift perception includes a transmission and a vehicle shift controller configured to perform shifting of the transmission. An electronic shift operator is configured to generate shift stage information by checking a state of a present shift stage or shift planning stage information by a shifting operation of a driver. An electronic braille module is configured to output the shift stage information or the shift planning stage information in braille information.

20 Claims, 7 Drawing Sheets

APPARATUS AND METHOD FOR SHIFT PERCEPTION

CROSS-REFERENCE TO RELATED APPLICATION

This application claims the benefit of priority to Korean Patent Application No. 10-2014-0143189, filed on Oct. 22, 2014, the entire contents of which are incorporated herein by reference.

TECHNICAL FIELD

The present disclosure concept relates to an apparatus for shift perception, and particularly, to an apparatus and a method to improve driving convenience for people with disabilities such as a hearing impaired and a visually impaired.

BACKGROUND

A shift stage to improve driver's perceptibility is displayed on an electronic shift lever. For example, a shift stage is displayed on a cluster or on an indicator, a warning sound is sent out to a specific stage, and the like.

When the shift stage is displayed on the cluster, the shift stage is displayed in an instrument panel of a vehicle with the numbers, the characters and the like. When the shift stage is displayed on the indicator, an increase or decrease of the shift stage is displayed by using the indicator. When the warning sound is sent out to the specific stage, a specific sound is outputted such as beep.

However, drivers with disabilities such as hearing or visual sensory organ, etc., it is difficult or impossible to percept the shift stage by the above examples.

SUMMARY

The present inventive concept relates to an apparatus and a method for shift perception improving perceptibility for people with disabilities such as hearing or visually impaired persons during driving.

According to an embodiment of the present inventive concept, an apparatus for shift perception may include a transmission, and a vehicle shift controller configured to perform shifting of the transmission. An electronic shift operator is configured to provide shift stage information by checking a state of a present shift stage or shift planning stage information when a driver performs shifting. An electronic braille module is configured to output the shift stage information or the shift planning stage information in braille information.

The apparatus for shift perception may further include bone conduction earphones that output the shift stage information or the shift planning stage information.

The apparatus for shift perception may further include a cluster that outputs the shift stage information or the shift planning stage information.

The conversion of the shift stage information or the shift planning stage information to the braille information may be made only when a vehicle starts.

The conversion of the shift stage information or the shift planning stage information to the braille information may be made only to produce final shift stage information during a predetermined time after a vehicle stops.

The vehicle shift controller and the electronic shift operator may use controller area network (CAN) communication.

The electronic shift operator may transmit the present shift stage in the shift stage information or the shift planning stage information, or an automatic engaging P-stage after a vehicle stops or a driver engaging N-stage to the bone conduction earphones.

The electronic shift operator may generate the shift stage information of the driver by using a lever or a button.

The electronic shift operator may be a shift-by-wire system.

The electronic Braille module may further output risk factor information.

According to another embodiment of the present inventive concept, a method for shift perception includes performing shift in which a vehicle shift controller performs a shift of a transmission. Shift stage information is provided in which an electronic shift operator that produces the shift stage information by checking a state of a present shift stage of the transmission or shift planning stage information when a driver performs shifting. The shift stage information or the shift planning stage information is output by an electronic braille module in braille information.

The step of outputting the shift stage information further may include outputting the shift stage information or the shift planning stage information to bone conduction earphones.

The step of outputting the shift stage information further may include outputting the shift stage information or the shift planning stage information to a cluster.

The step of outputting the shift stage information may include the electronic shift operator transmitting the present shift stage of the shift stage information or the shift planning stage information, or an automatic engaging P-stage after the vehicle stops or a driver engaging N-stage to the bone conduction earphones.

In accordance with embodiments of the present inventive concept, safety of driving and/or mobility of people with disabilities such as hearing or visually impaired by improving perceptibility on a risk factor.

DETAILED DESCRIPTION

Figure 1:
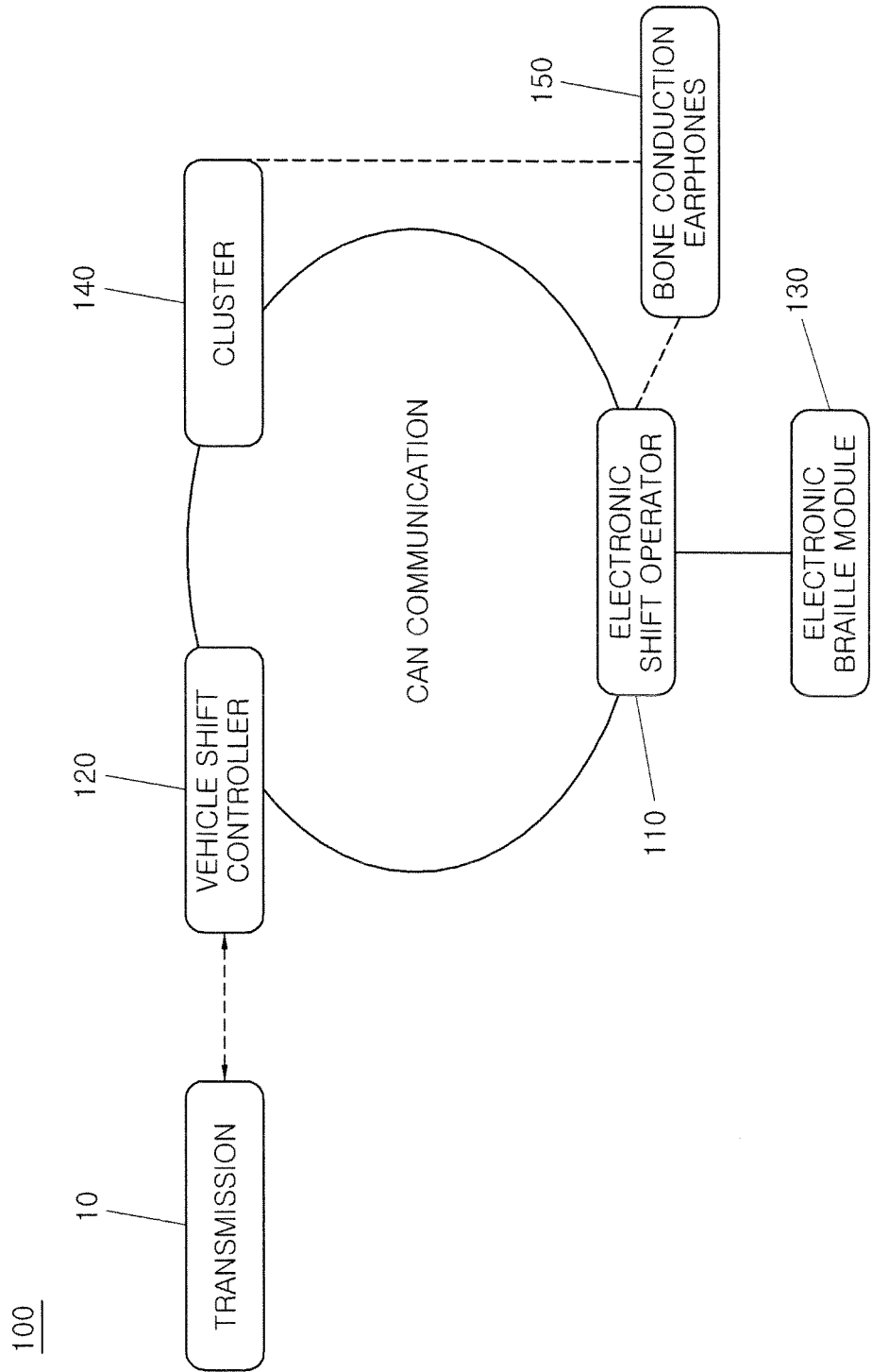
FIG. 1 is a block diagram of an apparatus for shift perception in accordance with an embodiment of the present inventive concept.

Since the present inventive concept may be variously modified and have several exemplary embodiments, exemplary embodiments will be shown in the accompanying drawings and be described in detail in a detailed description. However, it is to be understood that the present inventive concept is not limited to the exemplary embodiments, but includes all modifications, equivalents, and substitutions included in the spirit and the scope of the present inventive concept.

Throughout the accompanying drawings, the same reference numerals will be used to describe the same components.

Terms used in the specification, 'first,' 'second,' etc., may be used to describe various components, but the components are not to be construed as being limited to the terms. The terms are used to distinguish one component from another component.

For example, the 'first' component may be named the 'second' component and the 'second' component may also be similarly named the 'first' component, without departing from the scope of the present inventive concept. The term 'and/or' includes a combination of a plurality of items or any one of a plurality of terms.

Unless indicated otherwise, it is to be understood that all the terms used in the specification including technical and scientific terms has the same meaning as those that are understood by those who skilled in the art.

It must be understood that the terms defined by the dictionary are identical with the meanings within the context of the related art, and they should not be ideally or excessively formally defined unless the context clearly dictates otherwise.

Hereinafter, an apparatus and a method for shift perception according to an exemplary embodiment of the present inventive concept will be described in detail with reference to the accompanying drawings.

FIG. 1 is an exemplary block diagram illustrating a configuration of a shift perception apparatus 100 according to an exemplary embodiment of the present inventive concept. Referring to FIG. 1, the shift perception apparatus 100 may include a transmission 10, a vehicle shift controller 120 configured to perform shifting of the transmission 10, an electronic shift operator 110 configured to generate shift stage information by checking a present shift stage state or to generate the shift stage information by manual shifting of a driver, an electronic braille module 130 configured to output the shift stage information in braille information, bone conduction earphones 150 configured to output the braille information to a bone conduction, a cluster 140 configured to output the braille information, and/or the shift stage information, and so on.

The transmission 10 may perform gear shifting of a vehicle. The transmission 10 may be such an automatic transmission, a continuously variable transmission (CVT), an automated manual transmission (AMT), a dual clutch transmission (DCT), and the like.

The vehicle shift controller 120 may control the transmission 10 or check a state of the transmission 10.

The electronic shift operator 110 may communicate a control/data signal with the vehicle shift controller 120 through controller area network (CAN) communication. Therefore, the electronic shift operator 110 may transmit a shift stage signal produced by driver's operation of the vehicle shift controller 120. The electronic shift operator 110 may generate present shift stage information by receiving a present shift state signal from the vehicle shift controller 120. Further, a CAN communication method in the exemplary of the present inventive concept was described as the communication method, but not limited thereto, and the communication method such as power line communication (PLC), control pilot (CP), ZigBee, Bluetooth, and the like may be used.

The electronic shift operator 110 may be a lever (not shown) or a button (not shown) to operate the shift stage for user convenience.

Further, the electronic shift operator 110 may be a shift-by-wire system.

The electronic braille module 130 may output the shift stage information by expressing in the braille information. In other word, when the driver executes the shifting by operating the lever or the button of the electronic shift operator 110, the electronic braille module 130 displays a shift planning stage to shift in braille and notifies it to the driver. A present shift stage is displayed during driving.

Figure 6:
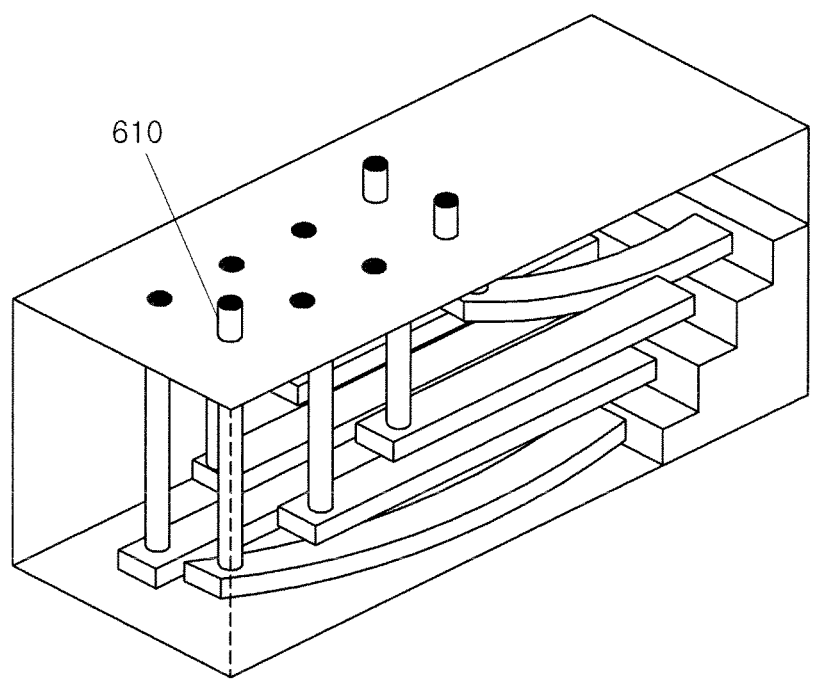
FIG. 6 is a schematic view showing a structure of an electronic braille module shown in FIG. 1.

The electronic braille module 130 may make braille patterns in which a dot size pin within determined standards protrudes on a surface such that a person with visual disability can read. FIG. 6 shows a concept of such an electronic braille module 130. Accordingly, the electronic braille module 130 may output the shift planning stage information and/or the present shift stage information in the braille patterns so that the driver may perceive it with tactile.

Referring FIG. 1, the cluster 140 may receive the shift stage information, the shift planning stage information, etc. from the vehicle shift controller 120 and/or the electronic shift operator 110, display the information and send out as a beep sound. The cluster 140 may be a display system, an audio system, and the like.

The bone conduction earphones 150 may output the shift stage information, and/or a risk factor, and the like to the driver by being connected with the cluster 140 and/or the electronic shift operator 110. The bone conduction earphones 150 may be connected with the cluster 140 and/or the electronic shift operator 110 by wireless or wire. The bone conduction earphones 150 may send out a unique signal corresponding to each shift stage.

The bone conduction earphones 150 may recognize a sound by passing vibration to a skull bone through an ear cartilage of the driver. Therefore, by using the bone conduction earphones 150, various alarm about the present shift stage, the shift planning stage, and a safety inhibiting element of forward/backward/rear lateral may pass to the driver.

Particularly, the shift perception apparatus 100 may be operated by a utility power but only operated with a power in a vehicle start-up state so as to prevent discharge of the vehicle, and operated in limited to percept final shift stage information to the driver during a predetermined time after the vehicle stops.

Figure 2:
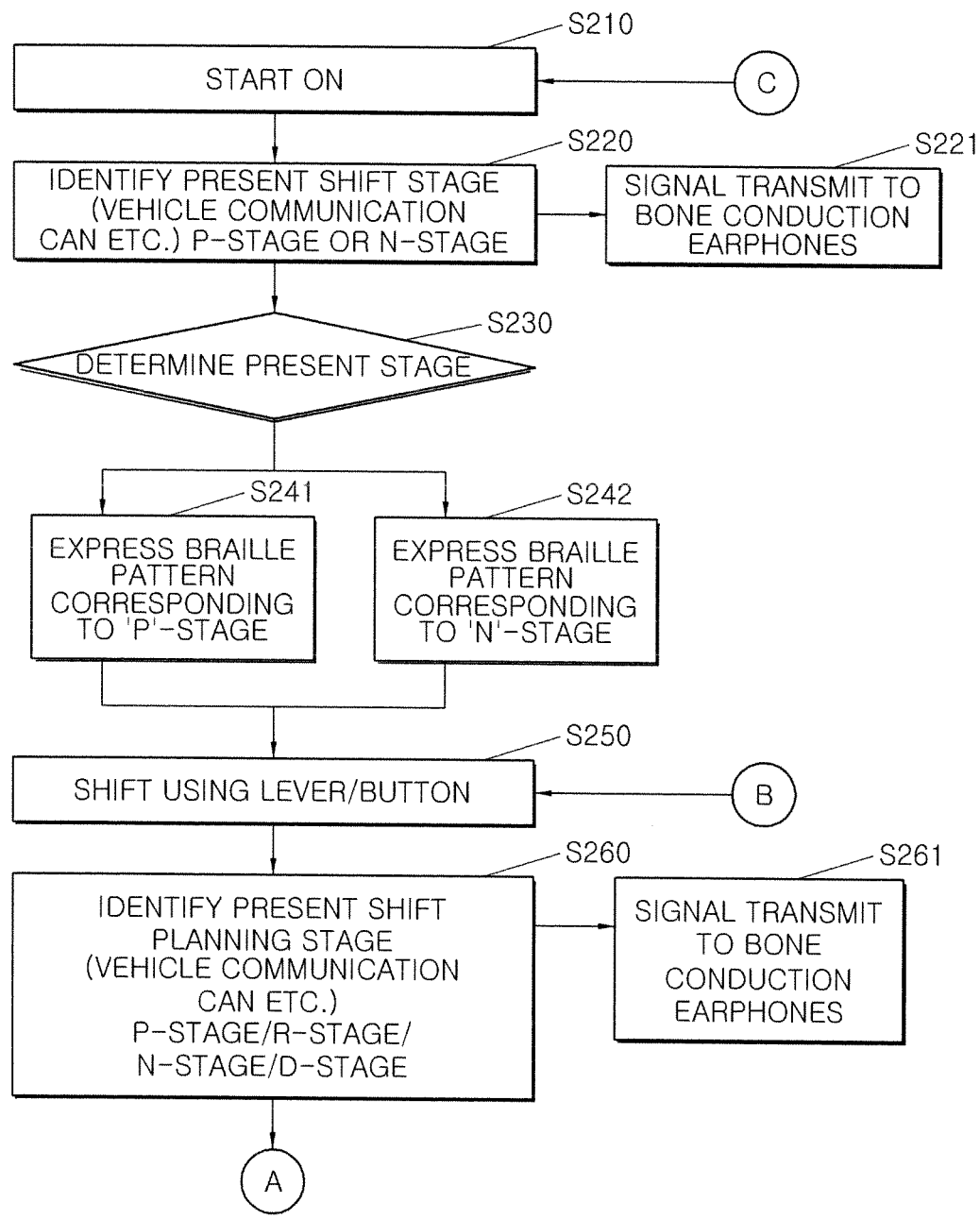
FIG. 2 is a flowchart showing a process of a shift perception in accordance with an embodiment of the present inventive concept.

FIG. 2 is a flowchart showing a process of the shift perception in accordance with an embodiment of the present inventive concept. Referring to FIG. 2, when the vehicle starts, the electronic shift operator 110 may check the present shift stage through information transmitted from the vehicle shift controller 120, and may determine the present shift stage (S210, S220, S230). Here, the electronic shift operator 110 may transmit the present shift stage information indicating the present shift stage state to the bone conduction earphones 150 (S221).

When the present shift stage is determined, the electronic braille module 130 may each selectively express the braille patterns corresponding to the "P" and "N" of the shift stage (S241, S242).

In this state, when the driver shifts using the lever or the buttons of the electronic shift operator 110, the electronic shift operator 110 may check the shift planning stage and transmit such shift planning stage information to the bone conduction earphones 150 (S250, S260, S261).

Figure 3A:
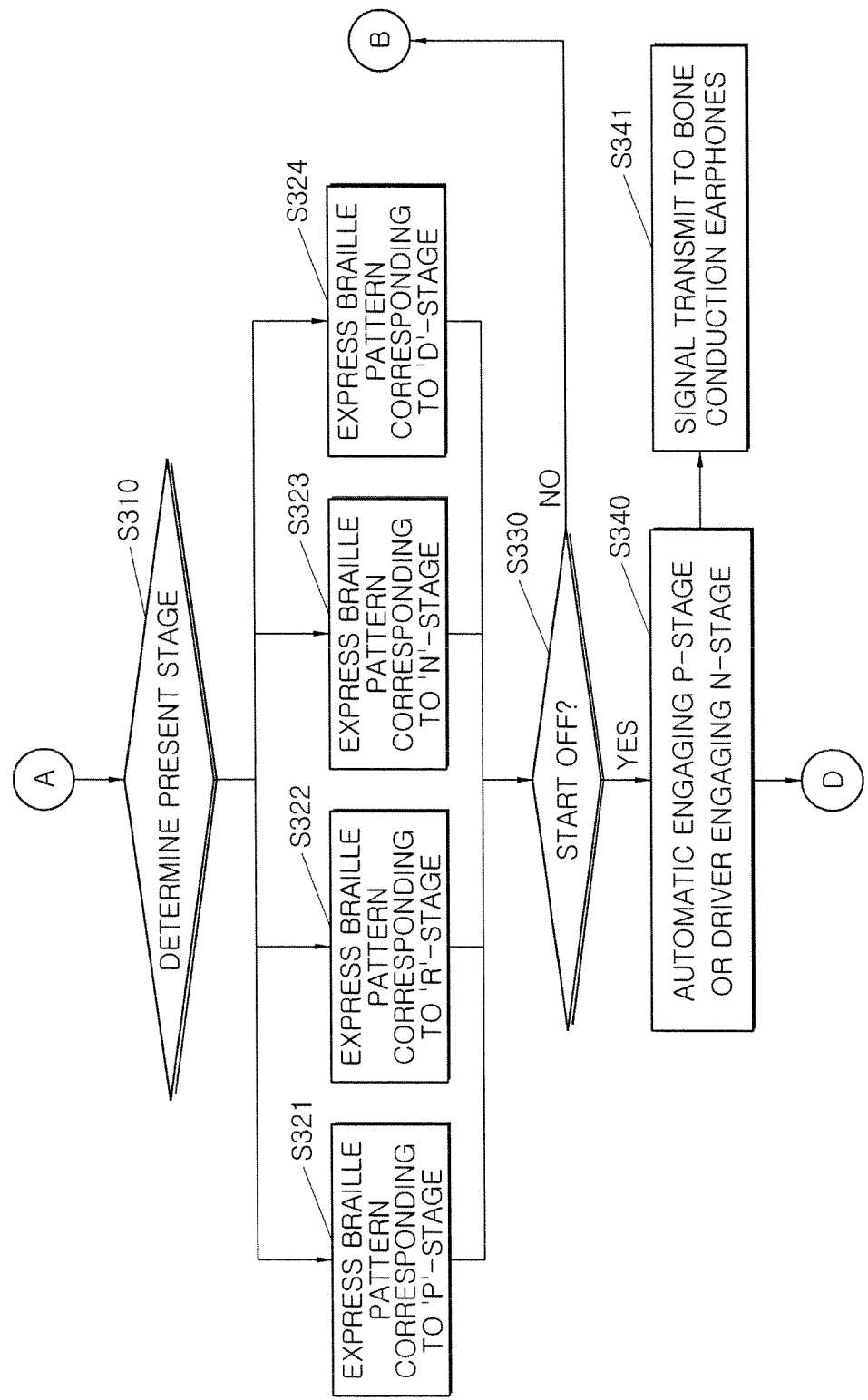
FIGS. 3A and 3B are flowcharts in connection with FIG. 2.
Figure 3B:
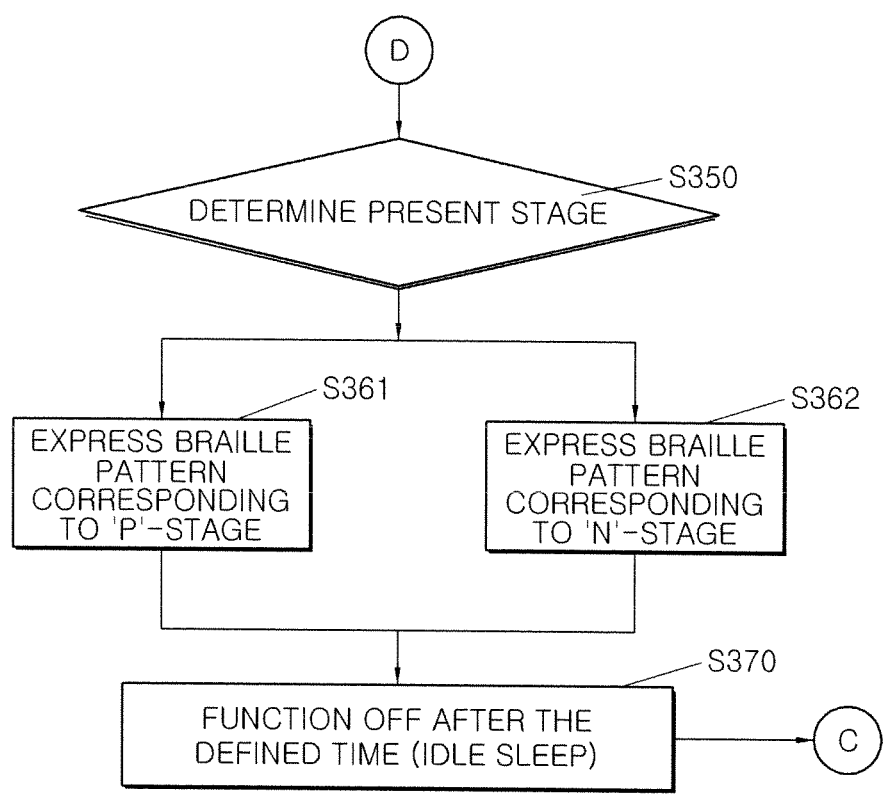

FIGS. 3A and 3B are flowcharts connected with FIG. 2. Referring to FIG. 3A, after step S260, the electronic shift operator 110 may determine the shift planning stage, and selectively express the braille patterns corresponding to the "P," "R," "N," and "D" of the shift stage (S310, S321, S322, S324).

When the vehicle stops running, the shift stage is engaged to the P-stage automatically, or when the driver engages the N-stage, the electronic shift operator 110 may determine it and transmit it to the bone conduction earphones (S330, S340, S341, S350).

Referring to FIG. 3B, at step S350, when the present shift stage is determined, the braille patterns corresponding to the "P" and "N" may be expressed selectively, and such the braille perception function may turn off after the predetermined time (S361, S632, S370). In other words, the vehicle may enter an idle sleep mode.

Figure 4:
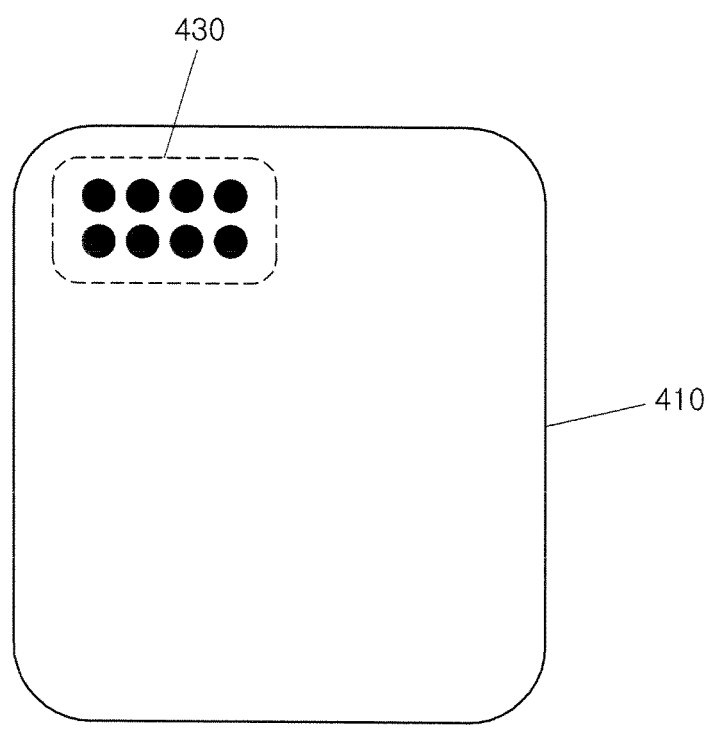
FIG. 4 is a top plan view of an electronic shift operator shown in FIG. 1.

FIG. 4 is a top plan view of an electronic shift operator 110 shown in FIG. 1. Referring to FIG. 4, an output 430 of the electronic braille module 130 is installed on a knob 410 of the electronic shift operator 110.

Figure 5:
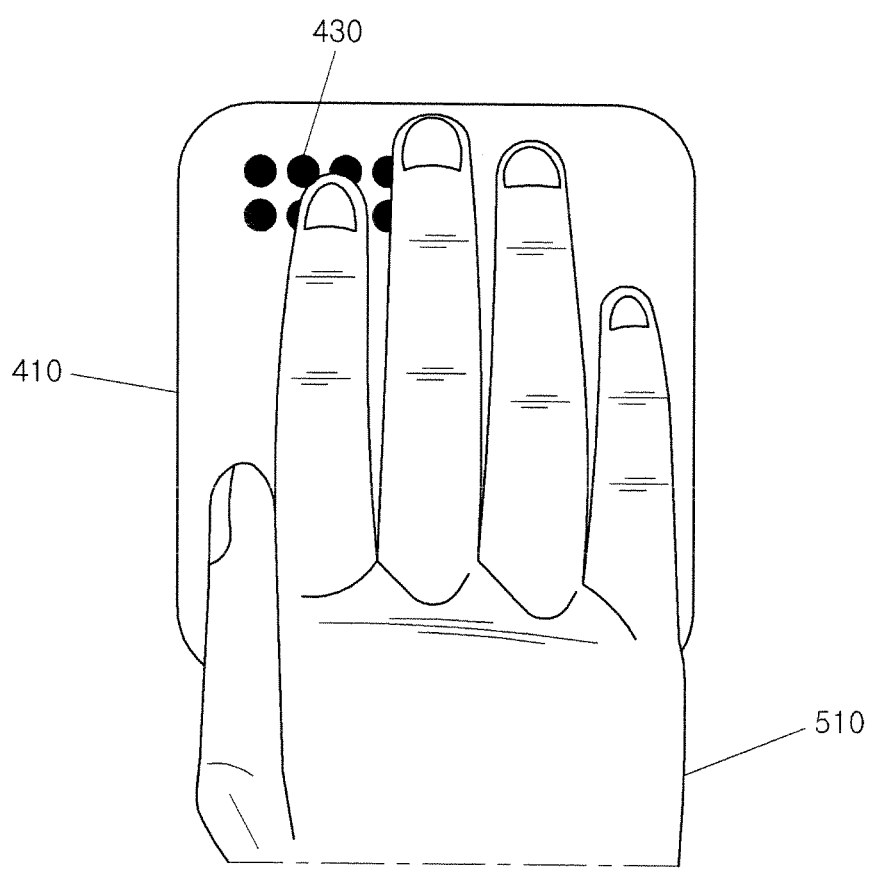
FIG. 5 is a schematic view showing delivery of a risk factor or shift stage information to a driver's hand by touching using an electronic shift operator shown in FIG. 4.

FIG. 5 is a schematic view showing delivery of a driving risk factor or the shift stage information with tactile to a driver's hand 510 using an electronic shift operator 110 shown in FIG. 4. FIG. 5 shows a position of the driver's hand 510 on the output 430 of the electronic braille module 130. Thus, the driver may percept the shift stage and/or the driving risk factor through the tactile of the driver's hand 510 (here, the index and middle finger of a driver's right hand).

FIG. 6 is a schematic view showing a structure of the electronic braille module 130. Referring to FIG. 6, the electronic braille module 130 may express the braille patterns by moving a plurality of pins 610 upwards and downwards through an actuator using an inverse conversion of the piezoelectric effect. The piezoelectric effect is a physical phenomenon in which a voltage is generated by polarization in a substance by applying a certain pressure. The piezoelectric effect has reversibility, and therefore may convert the voltage into a mechanical pressure.

Especially, the actuator may be a mechanical solenoid module and express the shift stage as braille patterns with combination thereof by controlling specific solenoid on-off in case of generating a signal corresponding to each stage.

Furthermore, when a risk factor such as sudden braking occurs, the entire pins 610 may inform them to the driver by moving upwards and downwards. It is also possible to implement a flash signal simultaneously.

What is claimed is:

1. An apparatus for shift perception comprising:
   a transmission;
   a vehicle shift controller configured to perform shifting of the transmission;
   an electronic shift operator, which communicates with the vehicle shift controller, configured to generate shift stage information by checking a state of a present shift stage; and
   an electronic braille module, which communicates with the electronic shift operator, configured to output the shift stage information in braille information.

2. The apparatus for shift perception of claim 1, further comprising bone conduction earphones configured to output the shift stage information.

3. The apparatus for shift perception of claim 1, further comprising a cluster configured to output the shift stage information.

4. The apparatus for shift perception of claim 1, wherein the shift stage information is converted into the braille information only in a start-up state of a vehicle.

5. The apparatus for shift perception of claim 1, wherein the shift stage information is converted into the braille information only to generate final shift stage information during a predefined time after a vehicle stops.

6. The apparatus for shift perception of claim 1, wherein the vehicle shift controller and the electronic shift operator communicate using a controller area network (CAN).

7. The apparatus for shift perception of claim 2, wherein the electronic shift operator transmits the present shift stage in the shift stage information to the bone conduction earphones.

8. The apparatus for shift perception of claim 1, wherein the electronic shift operator generates the shift stage information of the driver by operating one of a lever and a button.

9. The apparatus for shift perception of claim 1, wherein the electronic shift operator is a Shift-By-Wire system.

10. The apparatus for shift perception of claim 1, wherein the electronic braille module further outputs risk factor information.

11. A method for shift perception comprising steps of:
    shifting, by a vehicle shift controller, of a transmission;
    generating shift stage information, by an electronic shift operator which communicates with the vehicle shift controller, by checking a state of a present shift stage of the transmission; and
    outputting the shift stage information, by an electronic braille module which communicates with the electronic shift operator, in braille information.

12. The method for shift perception of claim 11, wherein the step of outputting the shift stage information further comprises outputting the shift stage information to bone conduction earphones.

13. The method for shift perception of claim 11, wherein the step of outputting the shift stage information further comprises outputting the shift stage information to a cluster.

14. The method for shift perception of claim 11, wherein the shift stage information is converted into the braille information only in a start-up state of a vehicle.

15. The method for shift perception of claim 11, wherein the shift stage information is converted into the braille information only to produce final shift stage information during a predetermined time after a vehicle is off.

16. The method for shift perception of claim 11, wherein communication between the vehicle shift controller and the electronic shift operator is controller area network (CAN) communication.

17. The method for shift perception of claim 12, wherein the step of outputting the shift stage information comprises the electronic shift operator transmitting a present shift stage of the shift stage information to the bone conduction earphones.

18. The method for shift perception of claim 11, wherein the electronic shift operator generates the shift stage information of the driver by operating one of a lever and a button.

19. The method for shift perception of claim 11, wherein the electronic shift operator is a shift-by-wire system.

20. The method for shift perception of claim 11, wherein the electronic braille module additionally outputs risk factor information.

* * * * *